Aug. 28, 1923.
J. M. WEST
1,466,320
DIFFERENTIAL GEARING
Filed April 20, 1923      2 Sheets-Sheet 1
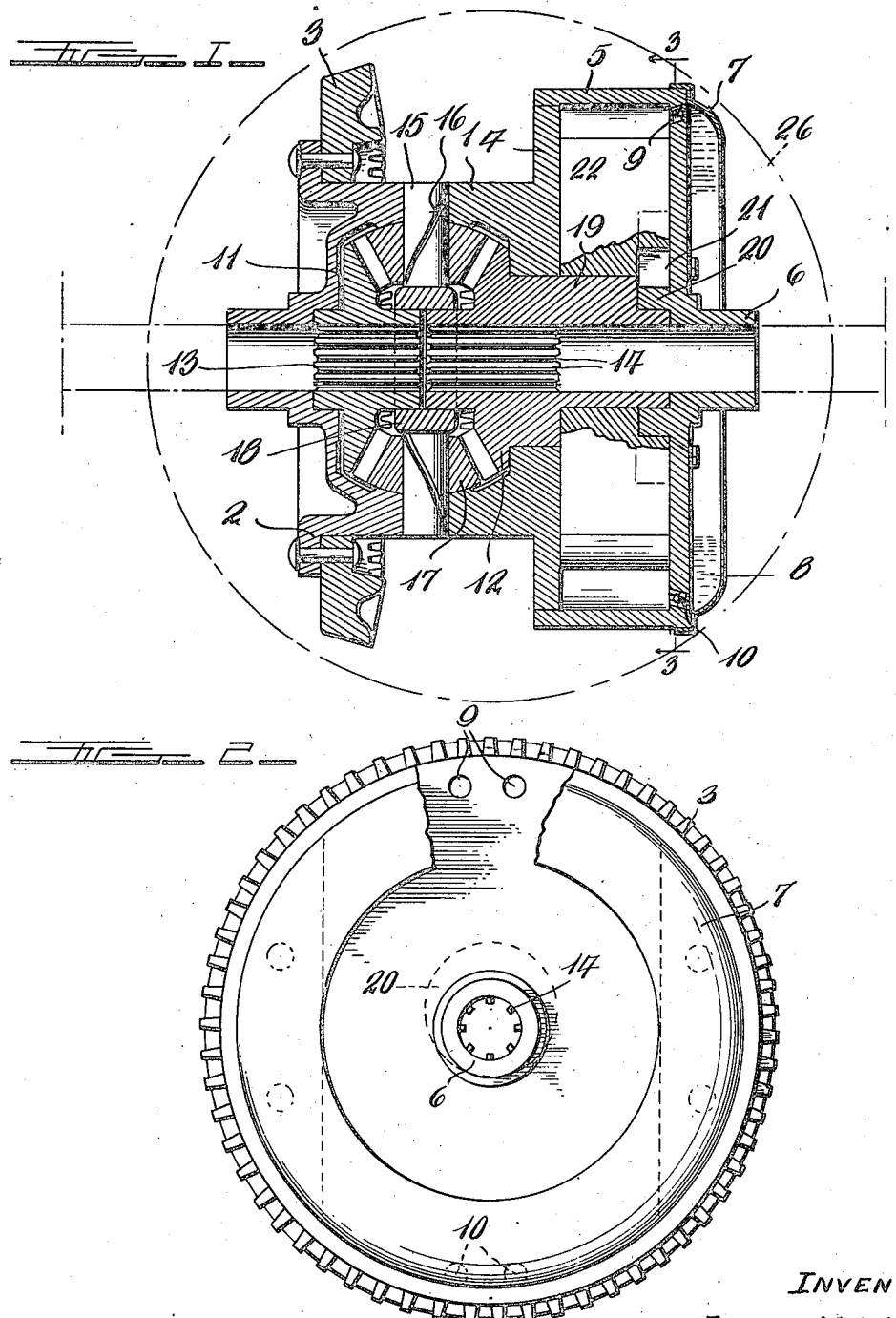
INVENTOR:
JAMES M. WEST
By William C. Linton
ATTORNEY.

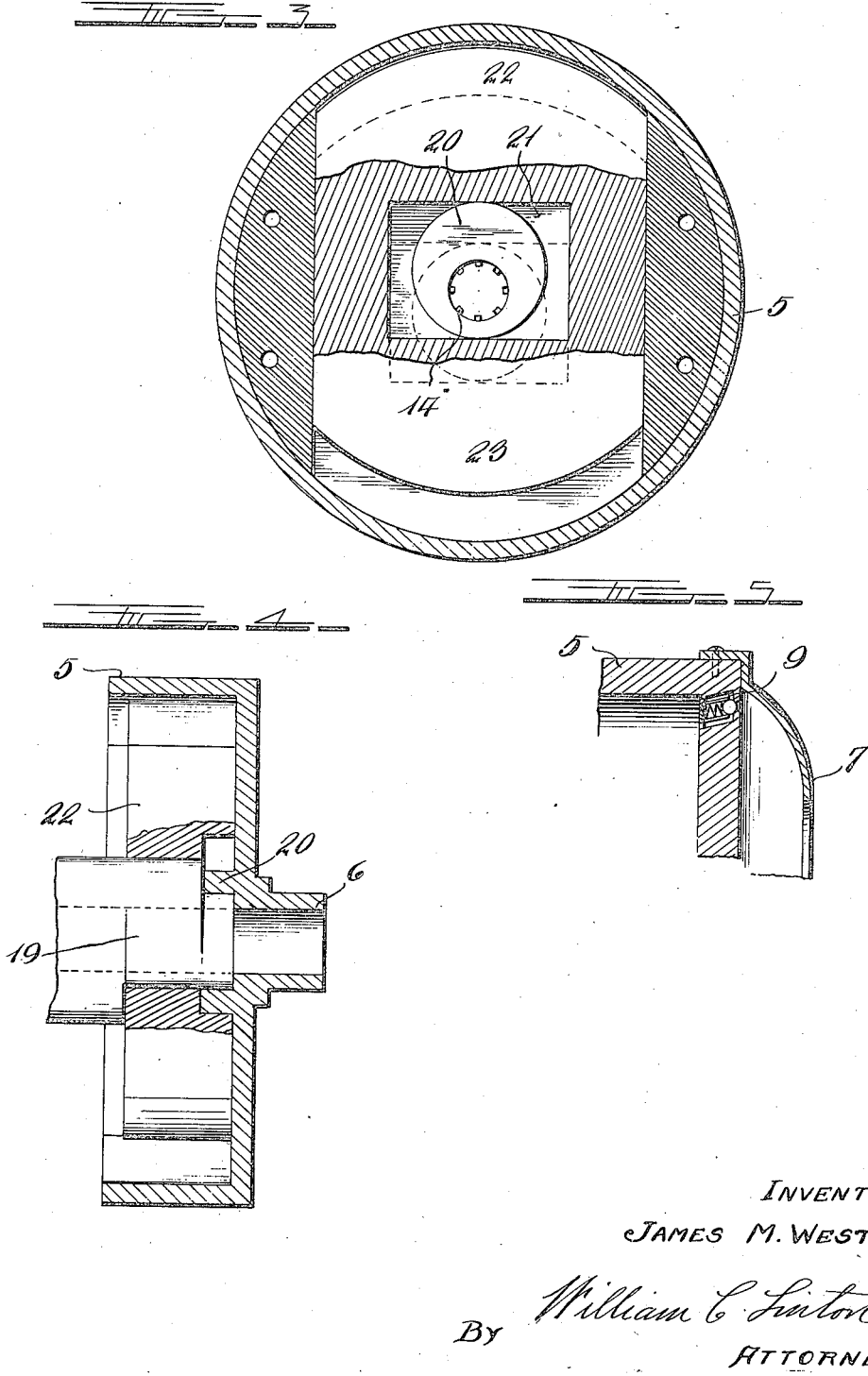

Patented Aug. 28, 1923.

1,466,320

UNITED STATES PATENT OFFICE.

JAMES M. WEST, OF RALEIGH, NORTH CAROLINA.

DIFFERENTIAL GEARING.

Application filed April 20, 1923. Serial No. 633,536.

*To all whom it may concern:*

Be it known that I, JAMES M. WEST, a citizen of the United States of America, residing at Raleigh, in the county of Wake and State of North Carolina, have invented certain new and useful Improvements in Differential Gearing; and I do hereby declare that the following is a full, clear, concise, and exact description of the invention, such as will enable others skilled in the art to which it appertains to make and use the same.

This invention relates to improvements in differential gearing for motor driven vehicles, having for an object to provide compensation or differential gearing for use in the transmission of power to the driving wheels of a vehicle equipped or to one of the two wheels of the vehicle, where the opposite wheel is free to rotate, the invention comprehending a novel form of fluid braking means adapted to function to prevent spinning or too rapid rotation of the free wheel.

It is likewise an object of the invention to provide a fluid braking mechanism for the differential gearing of a motor driven vehicle of such arrangement and construction as will permit usage of that lubricant usually or commonly contained in the driving axle housing, hence, avoiding the necessity of providing and maintaining a separate reservoir of fluid for the operation of the fluid braking mechanism.

Yet another object of the invention is to provide the gearing with means which, upon rotation, will transmit a reciprocal motion to the pistons of the pumps of the braking mechanism in order that the alternate intaking and exhausting of the braking fluid into and from the same will be effected, such means forming a portion of the housing of the braking mechanism and in consequence, lending to the simplicity of the arrangement.

Other objects will be in part obvious and in part pointed out hereinafter.

In order that the invention and its mode of operation may be readily understood by persons skilled in the art, I have in the accompanying illustrative drawings, and in the detailed following description based thereon, set out one possible embodiment of the same.

In these drawings:

Figure 1 is a vertical longitudinal section through the improved differential gearing equipped with the braking mechanism;

Figure 2 is a front elevation of the braking mechanism having a portion of the lubricant retaining ring broken away to show the arrangement of the ports;

Figure 3 is a vertical transverse section taken on the line 3—3 looking in the direction in which the arrows point;

Figure 4 is a fragmentary detail in vertical longitudinal section through the pump casing showing the eccentric connection of the pump pistons with one of the axle gears;

Figure 5 is an enlarged fragmentary detail in section showing the arrangement of the check valves in the ports of the pump casing.

Having more particular reference to the drawings, in connection with which like characters of reference will designate corresponding parts throughout, the invention may be stated to comprehend a casing indicated in its entirety by the numeral 1, being circular in cross section and having a circular flange 2 formed on one end thereof, to which there is bolted the usual bevelled drive gear 3, while a flange 4 is formed upon the opposite end of said casing and is adapted to be snugly engaged in the adjacent side of the circular drum-like container or casing 5, which as will be noted, has a concentrically arranged bearing sleeve 6 formed in its outer wall and a concentrically arranged bearing sleeve 20 formed in its inner wall through which a driving axle is adapted to extend. A circularly shaped flanged ring 7 is positioned adjacent the outer side wall of the drum-like casing 5 and serves as an oil retaining pocket for the braking mechanism, lubricant being taken from the driving axle housing, not shown, in a sufficient quantity and retained in the ring by centrifugal action as indicated by the numeral 8. To permit of ingress of the lubricant to and from the chamber constituted by the arrangement of the drum-like casing 5 and the circular flange 4 upon the adjacent end of the housing 1, ports 9 and 10 having spherical spring pressed check valves therein are formed at diametrically opposite points in the outer end wall of the drum-like casing 5.

Within the housing 1, there are arranged the usual axle bevelled gears 11 and 12 having internally arranged splines 13 and 14 formed in their respective bearing sleeves, whereby driving connection may be had with the several driving axles of the vehicle in order that rotary motion may be transmitted to the driving wheels of such vehicle. These axle gears together with the pinions 17, as will be understood, serve as the compensating device of the gearing.

Stub-shafts 15 having spiral oil grooves formed in their peripheral surfaces are mounted at diametrically opposite points in the housing 1 and receive thereon pinions 17, as an epicyclic step; a bearing bank 18 being engaged about the inner ends of the compensation or axle gears 11 and 12 and receiving the inner ends of the stub shafts 15 thereon.

The bearing or sleeve portion of the compensating or axle gear 12 has a portion thereof cut away, thus providing the same with an eccentric, indicated by the numeral 19, while the outer end of said sleeve is reduced and receives an inwardly extending bearing ring from the casing 5 for the purpose of supporting the outer end of the axle gear 19.

Mounted in the compartment provided for by the drum-like casing or housing 5 is a block 20 having the opposite ends thereof curved to conform to the curvature of the adjacent portions of the inner sides of said casing 5; the central portion of said block being cut away and indicated at 21 and loosely engaged over the eccentric portion 19 of the compensating gear 12. Thus, it will be understood that opposed pistons 22 and 23 are arranged within the chamber or compartment afforded by the casing 5 and in consequence, with rotation of the compensating gear 12, in relation to the casing 1 reciprocal motion will be imparted to the opposed pistons 22 and 23 in conjunction, hence, causing them to alternately effect intake and expulsion strokes with respect to their particular cylinders or portions of the compartment afforded by said casing 5. Thus, the intake of the lubricant 8 into the opposite portions or cylinders of the opposed pistons 22 and 23 by way of the check valved ports 9 and 10, and the exhaustion and expulsion of the said lubricant from the said opposite portions or cylinders by way of the clearance provided between the different spaces of the opposed portions of the block 20 and the adjacent walls of the chamber afforded by the drum-like casing 5 will be effected and in consequence such passage of the oil into and out of the chamber of the casing 5 will set up a material resistance to rotation of the compensating gear 12. Therefore, a braking action will be created and because of this, any tendency for the spinning of the several wheels of the equipped vehicle will be avoided.

It is understood that the mechanism hereinbefore described is adapted to be enveloped or housed in its entirety in the usual driving axle housing indicated herein in dotted dash lines and referred to by the numeral 26, said housing, of course, being provided with the usual lubricant filling way, whereby the gearing may be kept in a properly lubricated condition and likewise, a portion of said lubricant may be utilized by the pumping devices of the braking mechanism.

The operation of my improved differential gearing may be reviewed as follows:

Rotary motion is transmitted to the differential gearing by way of the driven gear 3 and with both rear wheels of the equipped motor driven vehicle travelling at the same speed, there will be no relative motion between the different parts of the gearing. However, when the rear or driving wheels travel at different speeds, the axle or compensating gear 12 together with all other gears in the differential assembly will revolve or rotate in relation to each other and in relation to the differential case. When the compensating gear 12 revolves in relation to the differential case, the block 20 providing the opposed pistons 22 and 23 is constrained to reciprocate in the chamber afforded by the drum-like casing 5 because of the following action of the eccentric 19; that is, by transmitting reciprocal motion to the opposed pistons 22 and 23 which sets up within the chamber of the drum-like casing 5, an alternate compression and suction in those spaces alternately occurring as between the outer ends of the opposed pistons and the adjacent portions of the drum-like casing 5. The suction created by the opposed pistons will be relieved by means of the check valves 9 and 10, while the compression will be controlled or limited by the properly arranged or constructed clearance between the different spaces of the opposed portions of the block 20 and the adjacent walls of the chamber afforded by the drum-like casing 5. The above described action or function, as will be understood, is dependent upon the alternate intake, compression and escape of the lubricant contained within the driving axle housing 26, and does not require a separate reservoir or storage compartment for supplying that lubricant required in the operation of the braking mechanism of the differential gearing. Furthermore, the necessary supply of oil to operate the braking mechanism of the gearing is kept properly located with relation to the ports 9 and 10 by means of the flanged retaining ring 7, the inner circumference of said ring being of a size sufficient to retain a supply of lubricant considerably in excess of the capacity of the strokes of the opposed pistons 22 and 23. This retaining ring 7 is located as to have the lower point of the inner circumference well below the working level of the lubricant supply regularly or commonly maintained in the housing 26 of the driving axle and therefore, as hereinbefore stated, will prevent the necessity of providing and maintaining a separate reservoir of fluid for the operation of the fluid braking mechanism.

Because of the varying viscosity of the lubricant used in different designs or types of automotive rear or driving axles, it naturally, will be understood, that the clearance between the opposed pistons 22 and 23 in the chamber provided therefor by the drum-like casing 5 may be varied to suit the particular working conditions encountered therein.

It is of importance to note, at this point, that the action of the braking mechanism is not intended to provide a braking or locking action of such power as to instantaneously and positively lock one driving wheel of a vehicle to the other, but rather, to form what may be termed a hydraulic braking action between the several driving wheels, hence, providing ample traction to the wheel which is not inclined to spin and yet, prevent a sudden stop or strain from being applied to the wheel which has insufficient traction; hence, avoiding the breaking or rupturing of axle shafts or other parts so strained. Likewise, the ordinary differential action is not interfered with in any way whatsoever, because under conditions requiring ordinary differential action, the relative motion is so slow, as between the different parts of the differential that the oil has ample time to escape when slowly compressed by the reciprocating action of the opposed pistons 22 and 23. However, when one driving wheel of the vehicle equipped with the invention has a tendency to spin or turn too rapidly with relation to the other driving wheel, the consequent reciprocation of the opposed pistons 22 and 23 is so rapid as to set up a resistance sufficient to create the necessary or desired braking action.

Manifestly, the construction shown is capable of considerable modification and such modification as is within the scope of my claims, I consider within the spirit of my invention.

I claim:

1. An automatic brake for differential gearing comprising a casing carried by and arranged adjacent said gearing having oppositely disposed valved ports therein, one of the compensating gears of said gearing having an eccentric on its bearing sleeve, a block having opposed pistons formed on its opposite portions received in said casing and adapted to be reciprocated with relative rotation of the eccentric, and a flanged oil retaining ring secured to the outer wall of said casing for supplying oil to said valved ports.

2. An automatic brake for differential gearing comprising a casing carried by and arranged adjacent said gearing having oppositely disposed valved ports therein, motion transmitting and converting means on one of the compensating gears of said gearing, opposed collectively movable pistons received in said casing adapted to be connected with and reciprocated by said motion transmitting and converting means, and a flanged oil retaining ring secured to the outer wall of said casing for supplying oil to said valved ports.

3. An automatic brake for differential gearing comprising a casing carried by and arranged adjacent said gearing having oppositely disposed valved ports therein, motion transmitting and converting means connected to one of the compensating gears of said gearing, a block having opposed pistons formed on its opposite portions and an opening formed in the central portion adapted to be engaged by said motion transmitting and converting means received in said casing and adapted to have reciprocal motion therein, and a flanged oil retaining ring secured to the outer wall of said casing for supplying oil to said valved ports.

4. An automatic brake for differential gearing comprising a casing carried by and arranged adjacent said gearing having oppositely disposed valved ports therein, an eccentric formed upon an end of the sleeve of one of the compensating gears of said gearing, a block received in said casing having opposed pistons formed on its opposite portions and a central opening therein loosely engaged over said eccentric whereby to permit of the transmission of reciprocal motion to said opposed pistons with relative rotation of said compensating gear and a flanged oil retaining ring secured to the outer wall of said casing for supplying oil to said valved ports.

5. In combination with differential gearing including a housing, a circular flange formed on one end of said housing, a drum-like casing snugly receiving said circular flange in the open side thereof, the outer wall of said drum-like casing having diametrically disposed valved ports formed therein, the sleeve of one of said compensating gears of the gearing being extended into the chamber provided by said drum-like casing and formed with an eccentric, a block mounted for reciprocal motion in said chamber having opposed pistons formed on its opposite portions and an opening formed in its intermediate portion loosely engaged over said eccentric whereby to permit the transmission of reciprocal motion to the opposed pistons, and a flanged oil retaining ring secured to the outer wall of said drum-like casing for supplying oil to said valved ports.

In witness whereof I have hereunto set my hand.

JAMES M. WEST.